United States Patent [19]

Menchetti

[11] Patent Number: 5,644,883
[45] Date of Patent: Jul. 8, 1997

[54] MULTIPLE USE CORNER CLIP

[75] Inventor: Robert J. Menchetti, Buffalo, N.Y.

[73] Assignee: National Gypsum Company, Charlotte, N.C.

[21] Appl. No.: 573,595

[22] Filed: Dec. 15, 1995

Related U.S. Application Data

[63] Continuation of Ser. No. 92,968, Jul. 19, 1993, abandoned, which is a continuation-in-part of Ser. No. 22,590, Feb. 25, 1993, abandoned.

[51] Int. Cl.$^6$ .................................................. E04B 2/00
[52] U.S. Cl. ................ 52/489.1; 52/481.1; 52/506.8; 52/658; 52/731.7; 52/787.2; 52/772
[58] Field of Search ....................... 52/220.1, 242, 52/241, 239, 287.1, 288.1, 289.1, 344, 348, 481.1, 489.1, 483.1, 717.06, 731.7, 745.12, 506.06, 506.07, 506.08, 690, 658, 656.9; 403/389, 403, 205, 231.1

[56] References Cited

U.S. PATENT DOCUMENTS

| | | |
|---|---|---|
| Re. 24,658 | 6/1959 | Hollister . |
| 585,111 | 6/1897 | Lehmann . |
| 600,392 | 3/1898 | Whitenack . |
| 619,968 | 2/1899 | Leonard . |
| 1,361,831 | 12/1920 | Crew . |
| 1,545,168 | 7/1925 | Schenck . |
| 1,598,129 | 8/1926 | Gersman . |
| 1,662,177 | 3/1928 | Williams . |
| 1,816,933 | 8/1931 | Robinson et al. . |
| 1,825,010 | 9/1931 | Murphy . |
| 2,027,882 | 1/1936 | Ross ............................. 52/481.1 X |
| 2,042,290 | 5/1936 | Barrett . |
| 2,044,637 | 6/1936 | Ross ............................. 52/481.1 X |
| 2,047,835 | 7/1936 | Prew ............................... 52/658 X |
| 2,049,278 | 7/1936 | Toussaint et al. ............... 52/489.1 |
| 2,065,493 | 12/1936 | Greulich . |
| 2,076,472 | 4/1937 | London . |
| 2,078,620 | 4/1937 | Venzie . |
| 2,092,210 | 9/1937 | Greulich . |
| 2,157,233 | 5/1939 | Geib, Jr. . |
| 2,185,904 | 1/1940 | Stowe ................................. 52/658 X |
| 2,271,472 | 1/1942 | Balduf . |
| 2,307,898 | 1/1943 | Olsen . |
| 2,316,668 | 4/1943 | Bronner . |
| 2,351,525 | 6/1944 | Leary . |
| 2,372,038 | 3/1945 | Westveer . |

(List continued on next page.)

FOREIGN PATENT DOCUMENTS

| | | |
|---|---|---|
| 121075 | 3/1946 | Australia . |
| 202688 | 3/1993 | China . |
| 393-000-A | 10/1990 | European Pat. Off. ............ 52/506.07 |
| 1095143 | 3/1955 | France . |
| 1432551 | 2/1966 | France . |
| 51685 | 7/1889 | Germany . |
| 5-112992 | 5/1993 | Japan . |
| 7329104 | 11/1984 | Taiwan . |
| 493129 | 12/1936 | United Kingdom . |

OTHER PUBLICATIONS

Copy of paper titled "USG Cavity Shaft Wall, Area Separation Wall, Furring & Double Wall Components". Part of a publication of Unimast Inc. titled Steel Framing Components and Accessories for Drywall, Plaster and Load Bearing Construction. It contains the date 1992.

Copy of paper titled "Shaftwall/Stairwall Components". Part of a paper titled Gyproc Products and Systems and contains the date 1994.

*Primary Examiner*—Carl D. Friedman
*Assistant Examiner*—Winnie Yip
*Attorney, Agent, or Firm*—Marshall, O'Toole, Gerstein, Murray & Borun

[57] ABSTRACT

A hollow shaft wall stud corner clip adjoins ends of horizontal studs at a shaft wall structure corner and is readily adaptable for supporting core boards in a fire rated ceiling or a fire rated duct and for holding core board in place at a top or a bottom of a horizontal stud hollow shaft wall. The clip has a central web for positioning against a stud or track flange and an angled flange with a core board-supporting extremity.

13 Claims, 6 Drawing Sheets

U.S. PATENT DOCUMENTS

| | | |
|---|---|---|
| 2,495,862 | 1/1950 | Osborn . |
| 2,554,418 | 5/1951 | Mortenson . |
| 2,605,867 | 8/1952 | Goodwin . |
| 2,638,637 | 5/1953 | Kump, Jr. . |
| 2,663,181 | 12/1953 | Collman . |
| 2,752,013 | 6/1956 | Cole . |
| 2,976,971 | 3/1961 | Lundberg . |
| 3,013,644 | 12/1961 | Smith et al. .............................. 52/690 |
| 3,065,575 | 11/1962 | Ray . |
| 3,090,164 | 5/1963 | Nelsson . |
| 3,101,817 | 8/1963 | Radek . |
| 3,176,432 | 4/1965 | Doolittle, Jr. ............................ 52/479 |
| 3,225,503 | 12/1965 | Rallis .................................... 52/506.08 |
| 3,235,039 | 2/1966 | O'Donnell . |
| 3,242,627 | 3/1966 | Fountain ................................. 52/287.1 |
| 3,251,164 | 5/1966 | Wright . |
| 3,266,209 | 8/1966 | Zibell ...................................... 52/489.1 |
| 3,271,920 | 9/1966 | Downing, Jr. ........................ 52/489.1 |
| 3,274,739 | 9/1966 | Gregoire . |
| 3,287,041 | 11/1966 | Cohen ........................................ 52/658 |
| 3,294,353 | 12/1966 | Rowe ..................................... 52/717.06 |
| 3,312,032 | 4/1967 | Ames . |
| 3,349,535 | 10/1967 | Balinski . |
| 3,362,056 | 1/1968 | Preller et al. . |
| 3,381,439 | 5/1968 | Thulin, Jr. . |
| 3,397,500 | 8/1968 | Watson, Jr. . |
| 3,418,776 | 12/1968 | Manderbach et al. . |
| 3,428,326 | 2/1969 | Clapsaddle . |
| 3,477,184 | 11/1969 | Johnson et al. . |
| 3,485,001 | 12/1969 | Miller . |
| 3,495,417 | 2/1970 | Ratliff, Jr. . |
| 3,508,364 | 4/1970 | Thompson . |
| 3,517,474 | 6/1970 | Lanternier . |
| 3,603,054 | 9/1971 | Didry . |
| 3,651,610 | 3/1972 | Donahue . |
| 3,702,044 | 11/1972 | Balinski . |
| 3,705,002 | 12/1972 | Varlonga . |
| 3,740,912 | 6/1973 | Sauer et al. . |
| 3,765,138 | 10/1973 | Bentle . |
| 3,839,839 | 10/1974 | Tillisch et al. . |
| 3,845,594 | 11/1974 | Butts et al. . |
| 3,845,601 | 11/1974 | Kostecky ................................. 52/690 |
| 3,866,376 | 2/1975 | Nelsson . |
| 3,881,293 | 5/1975 | Conville . |
| 3,921,346 | 11/1975 | Sauer et al. . |
| 3,940,899 | 3/1976 | Balinski . |
| 3,950,900 | 4/1976 | Simpson . |
| 3,974,608 | 8/1976 | Grearson . |
| 4,002,261 | 1/1977 | Litchfield . |
| 4,011,704 | 3/1977 | O'Konski . |
| 4,024,691 | 5/1977 | Hansen et al. ......................... 52/656.9 |
| 4,047,347 | 9/1977 | Scheid . |
| 4,047,354 | 9/1977 | Sutherland . |
| 4,047,355 | 9/1977 | Knorr . |
| 4,074,486 | 2/1978 | Grearson . |
| 4,109,440 | 8/1978 | Bill . |
| 4,125,984 | 11/1978 | Jonas . |
| 4,129,970 | 12/1978 | Whitney . |
| 4,147,379 | 4/1979 | Winslow . |
| 4,187,653 | 2/1980 | Kliewer, Jr. . |
| 4,201,020 | 5/1980 | Saunders . |
| 4,240,234 | 12/1980 | Eisinger et al. . |
| 4,251,973 | 2/1981 | Paik . |
| 4,353,192 | 10/1982 | Pearson et al. . |
| 4,364,212 | 12/1982 | Pearson et al. . |
| 4,435,936 | 3/1984 | Rutkowski ............................. 52/681.1 |
| 4,443,991 | 4/1984 | Mieyal ...................................... 52/242 |
| 4,587,783 | 5/1986 | McCoy et al. . |
| 4,597,278 | 7/1986 | Hamada et al. . |
| 4,640,076 | 2/1987 | Migliore . |
| 4,852,325 | 8/1989 | Dunn et al. . |
| 4,866,899 | 9/1989 | Houser . |
| 4,893,446 | 1/1990 | Gudmundsson et al. . |
| 4,897,976 | 2/1990 | Williams et al. . |
| 4,905,428 | 3/1990 | Sykes . |
| 4,909,006 | 3/1990 | Hickman et al. . |
| 4,914,880 | 4/1990 | Albertini . |
| 4,918,879 | 4/1990 | Bodurow et al. . |
| 4,969,304 | 11/1990 | Helderman . |
| 4,982,540 | 1/1991 | Thompson . |
| 5,065,559 | 11/1991 | Zegel et al. . |
| 5,090,174 | 2/1992 | Fragale . |
| 5,092,100 | 3/1992 | Lambert et al. ...................... 52/481.1 |
| 5,094,052 | 3/1992 | Gudmundsson et al. . |
| 5,129,628 | 7/1992 | Vesper . |
| 5,263,295 | 11/1993 | Laird et al. ........................... 52/506.08 |

5,644,883

1

MULTIPLE USE CORNER CLIP

This is a continuation of U.S. application Ser. No. 08/092,968, filed Jul. 19, 1993, now abandoned, which application is a continuation-in-part of my application, Serial No. 08/022,590, filed Feb. 25, 1993, now abandoned.

This invention relates to a small metal clip for connecting horizontal studs at a vertical corner of a horizontal stud wall and which is readily adaptable for several other uses in the construction of walls, ceilings and duct work.

BACKGROUND OF THE INVENTION

A wall has been developed in which a plurality of horizontal metal studs and horizontally extending gypsum core boards are erected alternately one on top of another with vertical stability being provided by a vertical post having a vertically extending channel into which each of the horizontal studs and core boards extend. Generally, such horizontal stud walls will include a vertical corner post with channels opening in two perpendicular directions, whereby the horizontal studs and the core boards of two perpendicularly abutting walls are joined.

SUMMARY OF THE INVENTION

The present invention is directed to a lower cost horizontal stud wall, wherein vertical corner posts of the prior wall are omitted and in their place small sheet metal stud corner clips connect the ends of perpendicularly extending horizontal studs and optionally small core board corner clips connect the ends of perpendicularly extending core boards.

It is an object of the present invention to provide small, low cost corner clips as a replacement for full wall height corner posts in horizontal stud walls.

It is a further object to provide a wall corner clip which is readily adaptable for other wall construction uses.

It is a further object to provide a lower cost horizontal stud wall.

It is a still further object to provide a novel method of erecting a horizontal stud wall.

BRIEF DESCRIPTION OF THE DRAWINGS

These and other objects and advantages will be more readily apparent when considered in relation to the preferred embodiments of the invention as set forth in the specification and shown in the drawings in which:

FIG. 7 is an isometric view of the core board corner clip of FIG. 1 affixed to two perpendicularly directed core boards.

DESCRIPTION OF THE PREFERRED EMBODIMENTS

Figure 1:
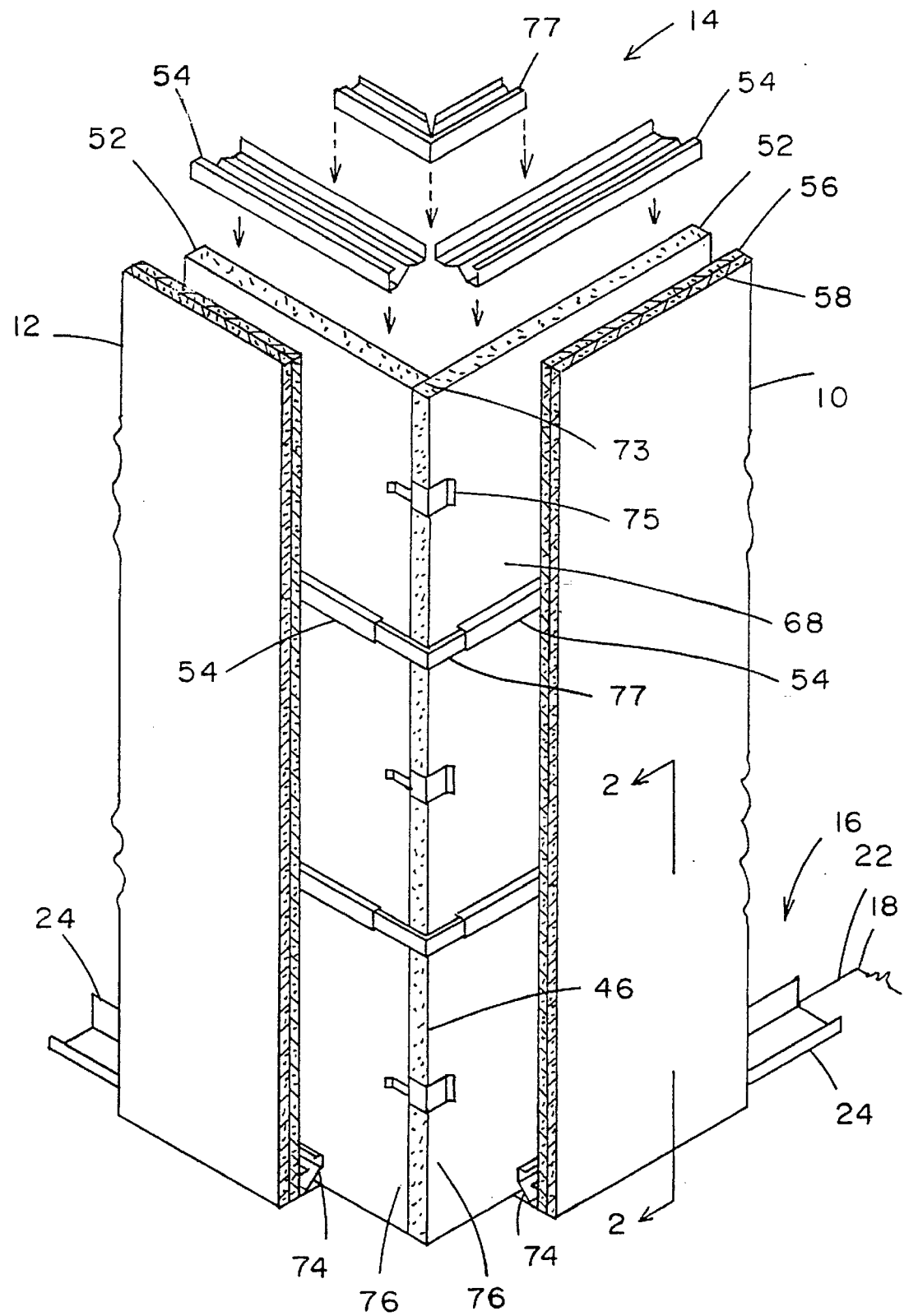
FIG. 1 is an isometric front view of a horizontal stud wall corner, partially constructed, with elements exploded upwards, and with outer wallboards cut away, further including a modified clip at the floor track.

Referring to FIGS. 1∝3, there is shown part of a side wall 10 and part of a front wall 12 of a hollow shaft wall structure 14 surrounding an elevator shaft 16. Elevator shaft 16 extends vertically through a plurality of floor-ceiling platforms, including the lower platform 18 and an upper platform 19, FIG. 9. The shaft wall structure 14 extends vertically from the lower platform 18 to the upper platform 19 along the edges 22 of these floor-ceiling platforms which surround and form the elevator shaft 16.

Side wall 10 consists of standard upwardly opening, channel-shaped floor track 24, having a horizontal web 26 and two vertical flanges 28, 30 and a similar downwardly opening ceiling track 31. Floor track 24 is mechanically affixed to the top of lower platform 18 and the ceiling track 31 is mechanically affixed to the bottom of the upper platform 19, each adjacent the edges 22 of these floor-ceiling platforms.

At the corner 46 of side wall 10 and front wall 12, two floor tracks 24 and two ceiling tracks 31 meet to form a 90° corner.

Figure 2:
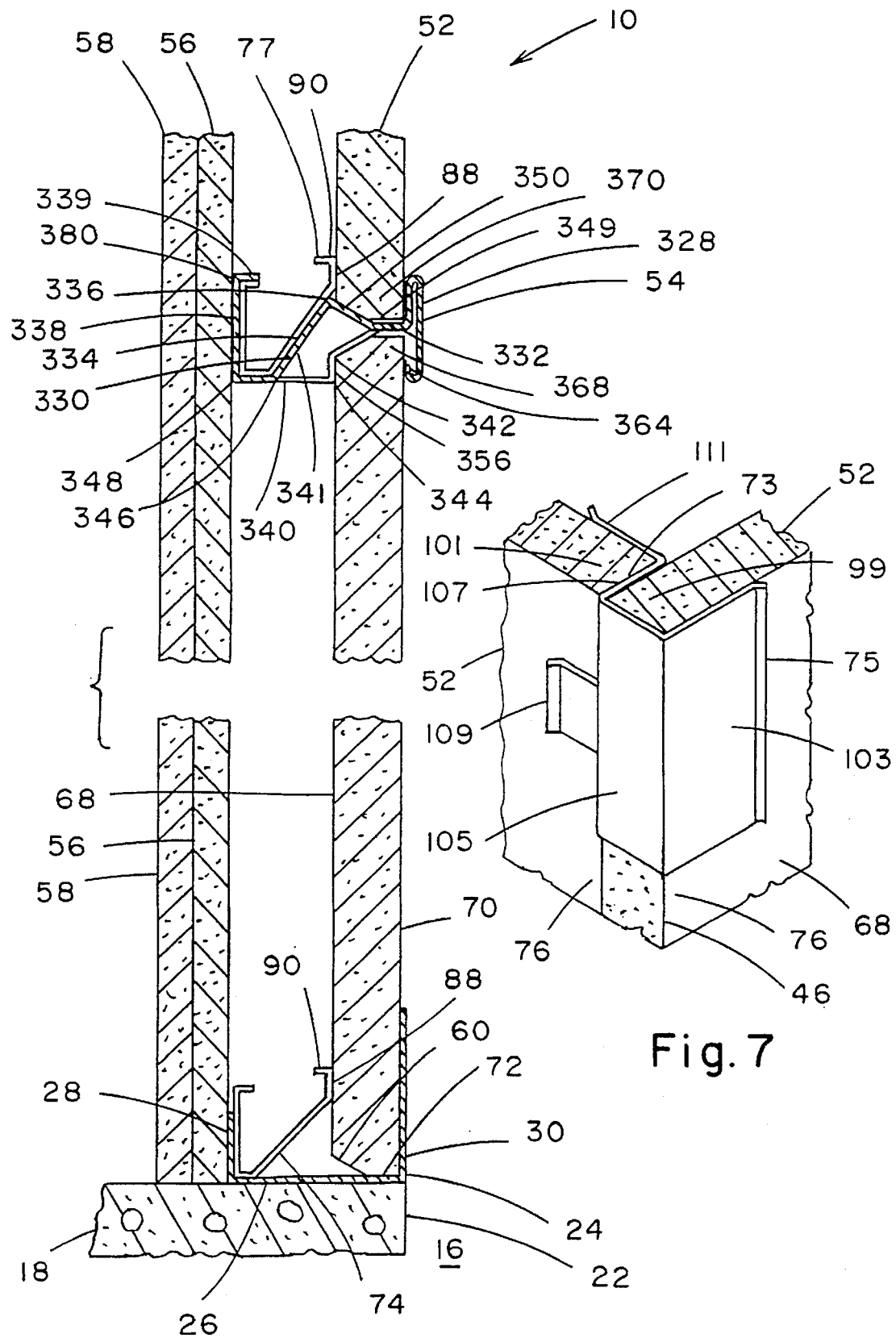
FIG. 2 is a vertical sectional view of a horizontal stud, core board, outer wallboard, a corner clip and a/modified clip taken on line 2—2 of FIG. 1.
Figure 3:
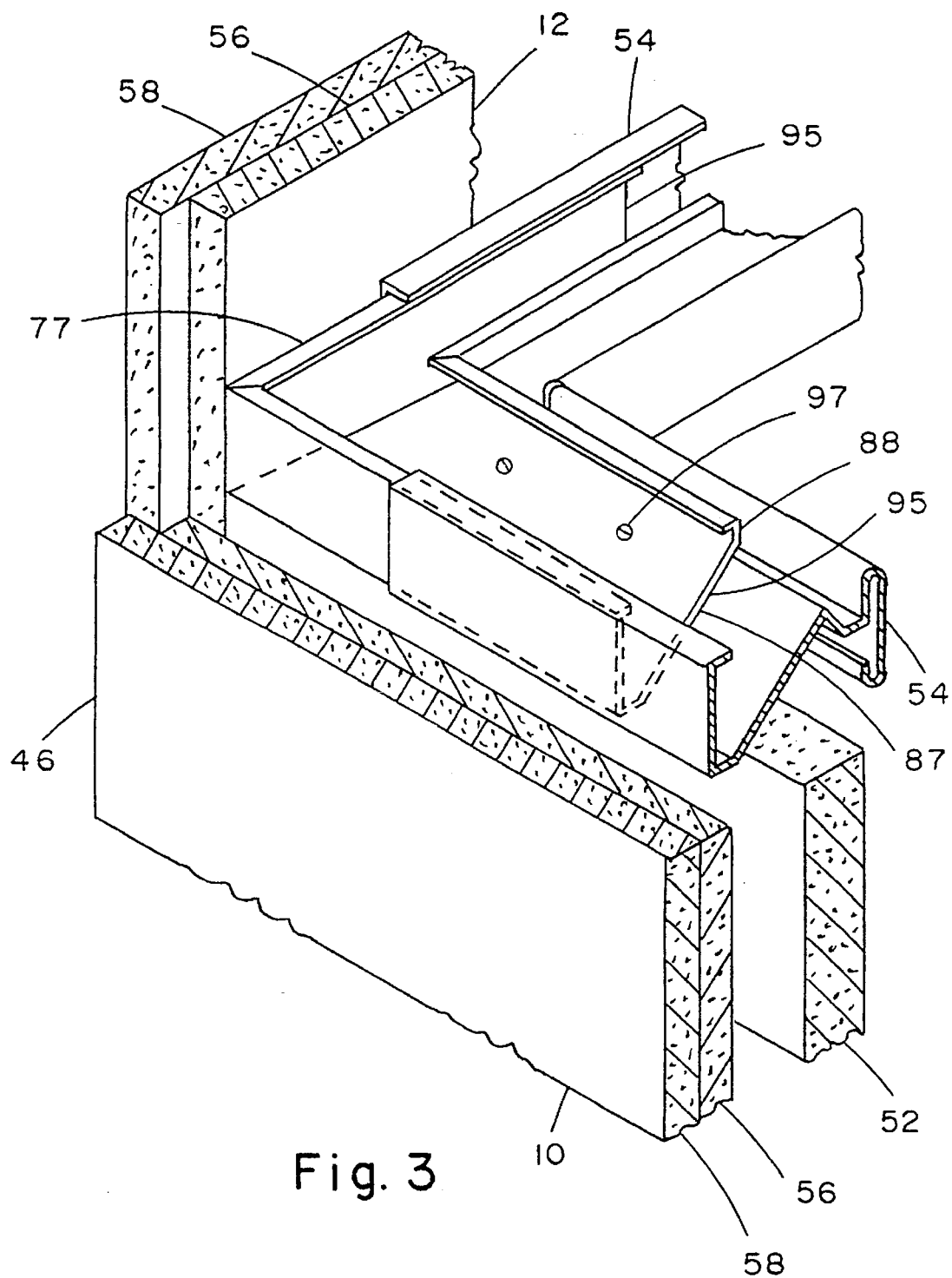
FIG. 3 is an enlarged isometric side view of the corner of FIG. 1, with outer wallboard cut away.

FIGS. 1–3 show the arrangement of core boards 52, horizontal studs 54 and outwardly disposed gypsum wide wallboards 56, 58, which combine to form the side wall 10 and the front wall 12.

Typically the core boards 52 are paper-covered gypsum boards which are, in cross section, 2 feet by 1 inch, and will normally have a length equal to the extent of the wall 10, 12. The core boards have bevelled edges 60, 62 along the two long edges of each core board 52. Alternatively, non-bevelled board can be used. Preferably, the bevelled edges 60, 62 have a flat portion 72, of a width of about ⅜ inch, however, this could be varied considerably.

The first core board 52 to be installed in constructing wall 10 has a flat portion 72 resting on web 26 of floor track 24 and inner face 70 is held against inner flange 30 by a plurality of modified clips 74. The ends 76 of core boards 52 of the two respective walls 10, 12 meet at the corner 46, and the outer face 68 of one core board 52 overlaps the end edge 73 of the other core board 52.

The two core boards are held in place by novel, small core board corner clips 75, affixed on the ends 76 of the abutting core boards 52.

On top of the first core boards 52 to be installed in the walls 10, 12 are the first horizontal studs 54 to be installed, and progressively, in constructing walls 10, 12, additional core boards 52 and horizontal studs 54 alternately are put into place.

The horizontal studs 54 all extend to very closely adjacent the corner 46, and horizontal studs 54 at each respective level of walls 10, 12 are rigidly connected, one to the other, by novel stud corner clips 77.

The horizontal studs 54 in the preferred embodiment, are an elongate roll-formed sheet of metal with a cross section which includes an inner flange 328, a web 330 extending perpendicularly outwardly from the middle of inner flange 328 about ⅝ inch, forming a flat portion 332, whereat a major portion 334 of web 330 extends upwardly and outwardly about ⅝ inch to bend 336 and thence downwardly and outwardly to an upwardly extending outer flange 338. Outer flange 338 extends upwardly to an inwardly directed lip 339. A minor portion 340 of web 330, about a 3inch length of each foot of web, extends downwardly and outwardly about ⅝ inch to bend 342, thence downwardly to bend 344 and thence outwardly to upwardly extending outer flange 338. Slits 346 were cut crosswise of web 330, during forming of horizontal stud 54, from the flat portion 332 to the outer flange 338. The slits 346 are preferably angled slightly to form minor portions 340 which have a shorter dimension along the outer flange bend 348 than along the bend 349, whereat the minor portion 340 is adjoined the flat portion 332.

Horizontal stud 54 is mounted atop an upper edge portion 368 of one of the two core boards 52, and a lower edge portion 370 of the other core board 52 is disposed atop stud 54.

The upper edge portion 368 is held firmly between board holding portion 356 of web minor portion 340 and the hem 364 of inner flange 328.

The lower edge portion 370 of the other core board 52 is held between the ramp portion 350 and inner flange 328.

Gypsum wide wallboard 56, 58 is screw attached against the outer surfaces 380 of the outer flanges 338, and to the stud corner clips 77.

Figure 4:
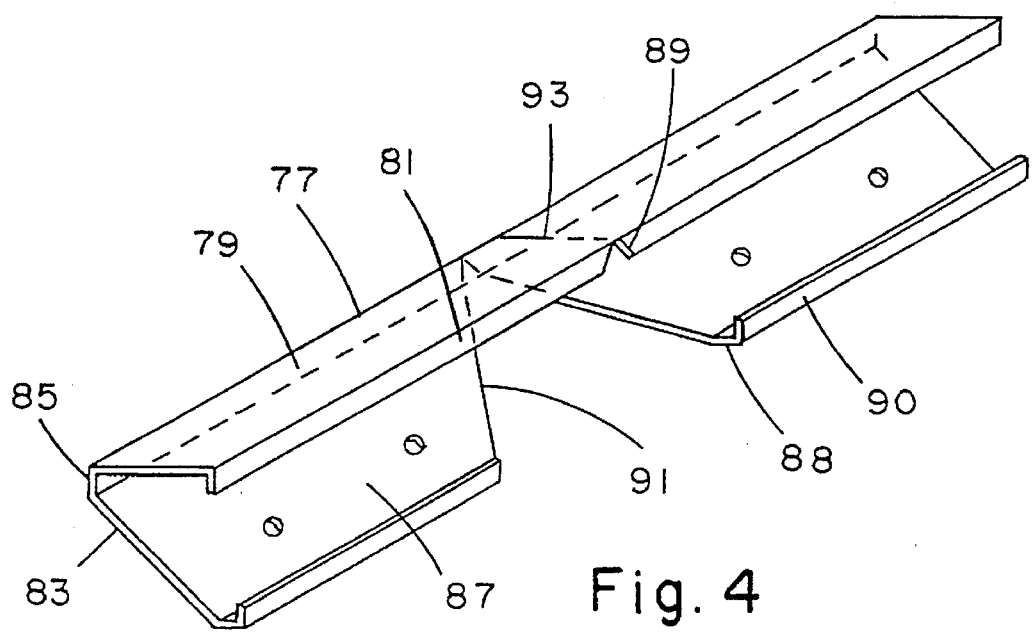
FIGS. 4 and 5 are isometric views of the stud corner clip of FIG. 1 prior to the final forming and as finally formed.
Figure 5:
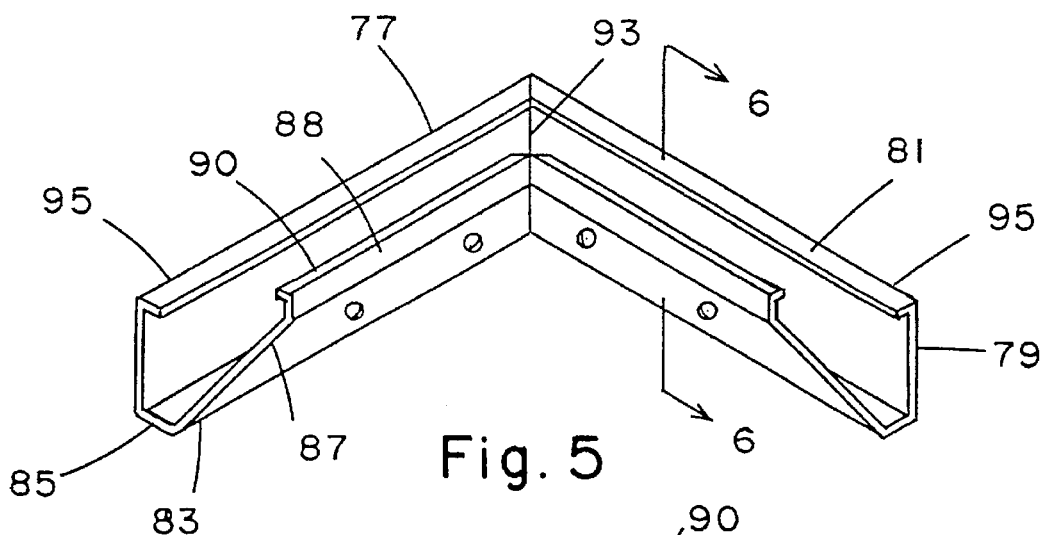
Figure 6:
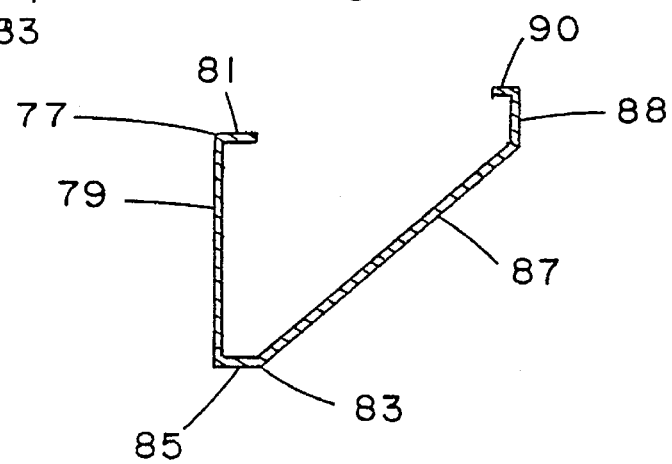
FIG. 6 is an end sectional view of the finally formed clip of FIG. 5, taken on line 6—6.
Figure 8:
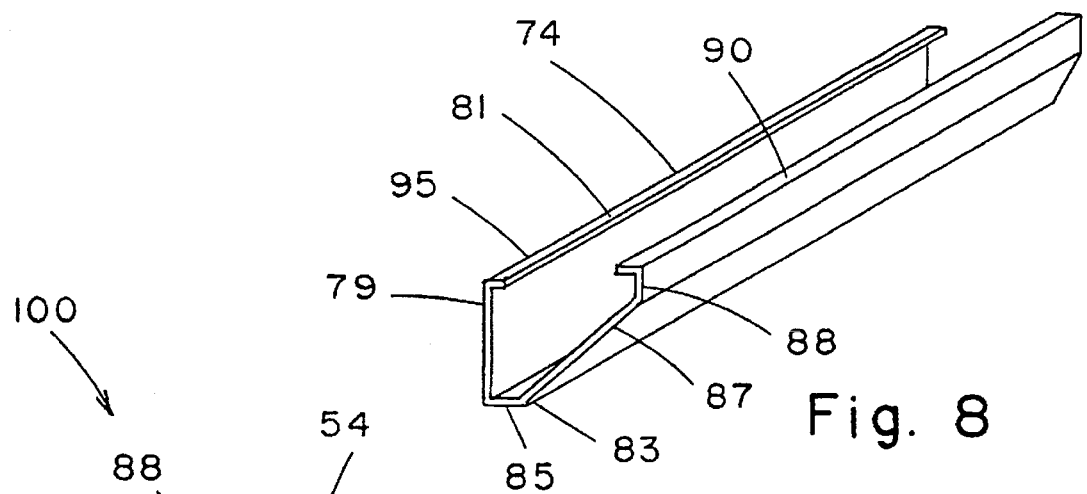
FIG. 8 is an isometric view of the modified clip of FIGS. 1 and 2.

In the preferred embodiment, stud corner clips 77 are formed from a single piece of sheet metal, FIGS. 4–6, having central web portion 79, an inwardly turned, narrow, top flange 81 and an inwardly turned, bottom flange 83. Bottom flange 83 includes a narrow, bottom portion 85, an inwardly and upwardly directed, wide-angled portion 87, and finally, a narrow, upwardly extending, board-supporting leg 88 with an inwardly directed lip 90. In order to form the stud corner clip 77, the top flange 81 and the bottom flange 83 are notched to form a 90° V-notch 89 in the top flange and a 90° V-notch 91 in the bottom flange. Notches 89 and 91 permit the web portion 79 to be bent 90° at fold 93, creating two perpendicular segments 95 forming the finished stud corner clip 77, with the notches completely closed. The top flange 81 and bottom flange 83 of the finished stud corner clip 77 become continuous around the fold 93 and may be welded where the notches 89 and 91 severed the flanges, if a more rigid stud corner clip 77 is desired.

The cross section of the stud corner clip 77 is identical to, but slightly smaller than, the cross section of the horizontal stud outer flange 338, lip 339 and the adjacent downwardly and outwardly portion 341 of the web major portion 334, whereby the two stud corner clip segments 95 can each be engaged firmly within the confines of the outer flange 338, lip 339 and portion 341. Stud corner clip 77 is also screw affixed to horizontal stud 54 by screws 97. The upwardly extending, board-supporting leg 88 will be seen to be pressing against a core board 52, providing more positive positioning of the core board 52 against inner flange 328.

Core board corner clips 75 aid in the construction of shaft wall structure by holding abutting core boards 52 together at the corner 46 while horizontal studs are being placed thereon and being adjoined by a stud corner clip 77. With the preferred form of horizontal stud 54, core boards 52 will generally stay in place without core board corner clips 75 until upper horizontal studs 54 and corner clips 75 are mounted thereon, however, core board corner clips 75 do contribute to ease of erection and stability of the completed shaft wall structure 14. Core board corner clips 75 are formed of a single piece of sheet metal bent to form a pair of perpendicular directed channels 99, 101. Channels 99, 101 are formed by the shape of core board corner clip 75, which includes a first flange 103, a bottom wall 105 and a central wall 107 forming channel 99. Central wall 107 has a small lip 109, which is cut and bent out of central wall 107. A second flange 111 extends perpendicularly from the end of central wall 107, parallel to lip 109, which together form channel 101, perpendicular to channel 99. The perpendicularly extending core boards 52 have ends 76 extending respectively into channels 99, 101.

Figure 9:
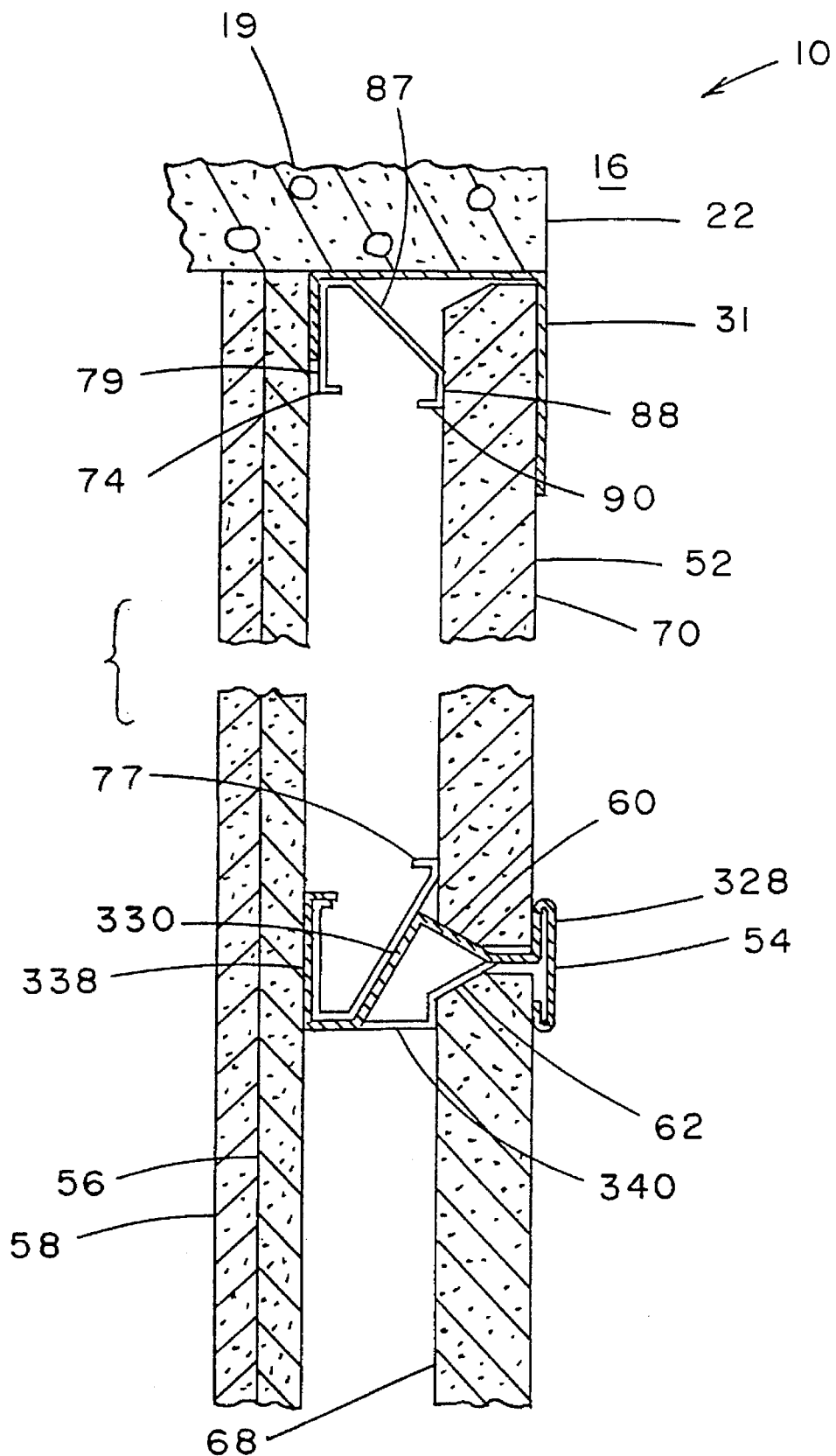
FIG. 9 is a vertical sectional view of the top of the wall of FIG. 2.

Referring now more particularly to FIGS. 2 and 9, there is shown the bottom and top portions of side wall 10. A modified clip 74, which can be either a stud corner clip 77 which has been straightened out at fold 93, or alternatively can be one of the two segments 95, formed by cutting a stud corner clip 77 in half at fold 93, is shown holding a core board 52 against inner flange 30 of floor track 24 and a second modified clip 74 is shown similarly holding a core board 52 inwardly in the ceiling track 31.

Figure 10:
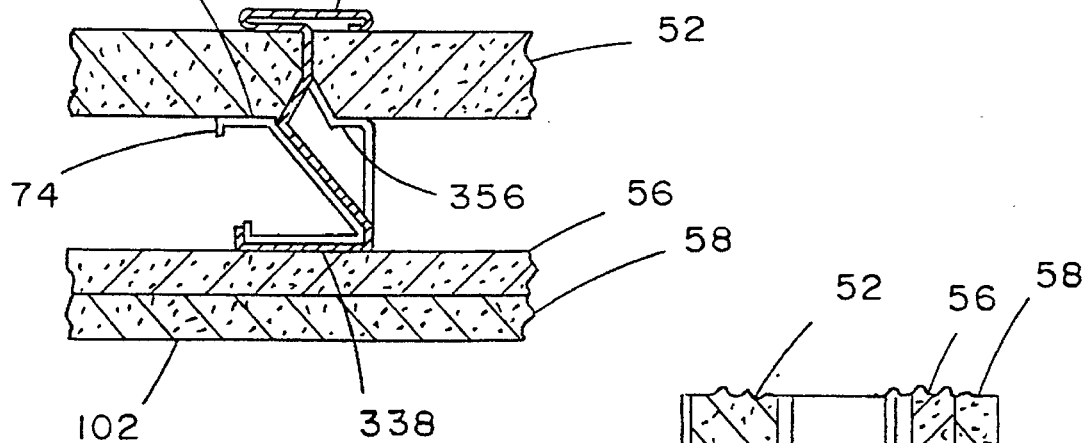
FIG. 10 is an end sectional view of a horizontal stud employed in a fire rated ceiling with a modified clip supporting a horizontally disposed core board.

FIG. 10 shows a fire rated ceiling 100, wherein core boards 52 are disposed horizontally between studs 54 and a modified clip 74 is disposed within stud 54, with board-supporting leg 88 providing additional support to the core board 52 which is less firmly supported by stud 54. The other core board 52 is firmly supported by board holding portion 356. Wallboards 56, 58 are affixed to the outer flange 338 of stud 54, forming the ceiling surface 102.

Figure 11:
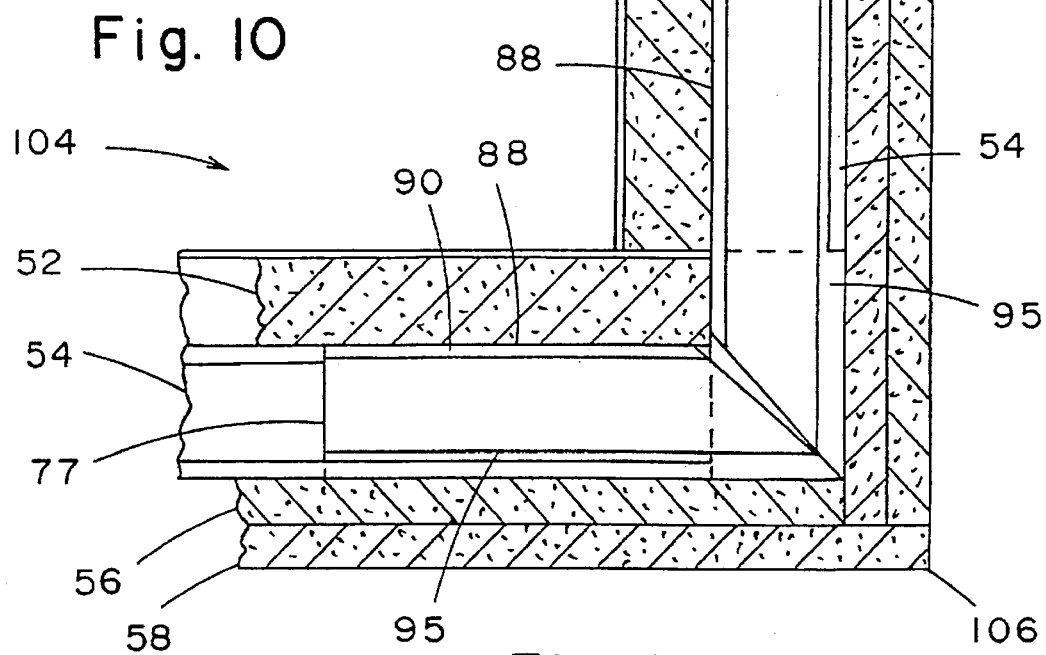
FIG. 11 is sectional view of a bottom corner of a horizontal air duct.

FIG. 11 shows a bottom corner of a fire rated air duct 104, wherein studs 54, core boards 52, corner clips 77 and wallboard 56, 58 are combined in a relationship similar to the structure of corner 46 of FIG. 1, but with a corner 106 which extends horizontally rather than vertically. In the air duct 104, the corner clip 77 provides support for the core boards 52, with board-supporting leg 88 functioning similar to the manner described above for a fire rated ceiling 100.

Having completed a detailed disclosure of the preferred embodiments of my invention, so that those skilled in the art may practice the same, I contemplate that variations may be made without departing from the essence of the invention.

I claim:

1. A horizontal stud wall corner structure comprising two vertical walls abutting one another at an angle and forming thereat a vertical wall corner, each said wall comprising substantially horizontal floor and ceiling tracks, a plurality of horizontal metal studs extending between and substantially horizontal with said floor and ceiling tracks, each of said studs have a cross-sectional shape formed by a plurality of wall portions, a plurality of rigid, horizontally extending core boards disposed between said studs whereby said wall has alternating horizontal studs and horizontally extending core boards, said horizontal studs of each of said walls being at substantially the same vertical height as said horizontal studs of the other of said walls, said two walls being adjoined at said corner by a plurality of stud corner clips, each said stud corner clip having two segments extending at an angle, one to the other, equal to said angle between said walls, said segments each having a cross-sectional shape similar to a portion of said cross-sectional shape of said studs, and said segments interfitting with studs whereby said segments are each respectively affixed to one of said horizontal studs, said segments each having a board-supporting portion disposed between said wall portions of said studs and said core board, providing support for maintaining said core board in a fixed position.

2. The wall corner structure of claim 1, wherein said cross-sectional shape of said corner clip interlocks with said horizontal stud cross-sectional shape.

3. The wall corner structure of claim 1, wherein said stud corner clips are formed of a single piece of sheet metal formed to a cross section compatible with engaging said horizontal stud and folded along a fold line to an angle equal to the angle between said two vertical walls.

4. The wall corner structure of claim 3, wherein a portion of said single piece of sheet metal has had a V-notch cut out of it adjacent said fold line.

5. The wall corner structure of claim 1, wherein said wall is a hollow shaft wall for enclosing an elevator shaft.

6. The wall structure of claim 1, wherein said wall portions of said horizontal studs comprise an inner flange, an outer flange, a web adjoining said flanges, and said horizontally extending core boards have bottom and top edges engaging said horizontal stud webs, said board-supporting portion of each said corner clip segment engaging a portion of said core board which is adjacent said bottom edge.

7. The wall structure of claim 6, wherein wallboards are affixed against the outer side of said outer flanges in spaced parallel relation to said core boards.

8. A horizontal stud wall corner clip comprising a single sheet of metal having two segments arranged substantially perpendicularly, one to the other, each said segment having a folded, continuous central web and said webs of said two segments being integrally joined at a right-angle bend, said web of each of said segments having top and bottom flanges extending in the same direction from said web, each of said flanges having a 90° V-notch formed therein, said V-notches extending across said flanges and to said central web and said notches being closed when said segments are arranged substantially perpendicularly, and said bottom flange of each of said segments having an angled portion and a board-supporting portion, said angled portion disposed between said central web and said board-supporting portion at an angle with respect to said central web, said angled portion further being attached to and forming an obtuse angle with said board-supporting portion, said board-supporting portion disposed at an extremity of said bottom flange and extending parallel with said central web.

9. A horizontal stud wall stud corner clip as defined in claim 8, said bottom flange extending inwardly and upwardly from said central web of each segment, with said board-supporting portion being at the extremity of each said bottom flange.

10. A horizontal stud wall for mounting on a substantially flat horizontal floor, comprising a plurality of horizontal metal studs in vertically spaced positions, a plurality of rigid, horizontally extending core boards disposed between said studs whereby said wall extends in a substantially vertical plane and has alternating horizontal studs and horizontally extending core boards, the improvement wherein:

the lowest of said core boards has a bottom edge, a C-shaped floor track including a horizontal web between a pair of vertical flanges, said bottom edge being disposed between said flanges and resting on said web, and a sheet metal clip for holding said bottom edge firmly against one of said flanges, said sheet metal clip having a vertical web disposed against the other of said flanges and having an upwardly directed bottom flange extending at an angle from said vertical web to said lowest core board, and said sheet metal dip further including a board supporting leg which extends vertically from said bottom flange and is flat against said lowest core board.

11. A horizontal stud wall for engagement with a substantially flat horizontal ceiling, comprising a plurality of horizontal metal studs in vertically spaced positions, a plurality of rigid, horizontally extending core boards disposed between said studs whereby said wall extends in a substantially vertical plane and has alternating horizontal studs and horizontally extending core boards, the improvement wherein:

the highest of said core boards has a top edge, a C-shaped ceiling track including a horizontal web between a pair of vertical flanges, said top edge being disposed between said flanges, and a sheet metal clip for holding said top edge firmly against one of said flanges, said sheet metal clip having a vertical web disposed against the other of said flanges and having a downwardly directed top flange extending at an angle from said vertical web to said highest core board, and said sheet metal clip further including a board supporting leg which extends vertically from said top flange and is flat against said highest core board.

12. A ceiling comprising a plurality of horizontal metal studs and a plurality of rigid, horizontal core boards disposed between said studs, each of said studs having a vertically extending web with a first flange and a second flange extending horizontally from each said stud web, said web, said first flange and said second flange of each stud forming a channel opening therebetween, said first flange being vertically spaced above said second flange, the improvement wherein:

at least one of said core boards having one edge disposed within said channel opening and between said horizontally extending flanges, said core board engaging said first flange on a side which is within said channel opening, and a sheet meatal dip holding said core board against said first flange, said sheet metal clip having a web disposed against said stud second flange and clip flange extending upwardly at an angle with respect to said stud second flange, said clip flange also disposed against said core board, whereby said core board is sandwiched between said first flange and said clip flange and said first flange supports said core board.

13. A duct comprising a plurality of walls, including a vertical side wall and a horizontal bottom wall, said side wall and said bottom wall forming a horizontal wall corner, each of said walls comprising a plurality of metal studs and a plurality of core boards disposed between said studs whereby said wall has alternating studs and core boards, said two walls being adjoined at said corner by a plurality of stud corner clips, each said stud corner clip having two segments extending at an angle equal to an angle existing between said two walls, said two corner clip segments being each respectively affixed to one of said studs, the improvement wherein:

said corner clip segments each include a board-supporting portion disposed against one of said core boards supporting said core board relative to said stud.

* * * * *

UNITED STATES PATENT AND TRADEMARK OFFICE
CERTIFICATE OF CORRECTION

PATENT NO.  : 5,644,883
DATED       : July 8, 1997
INVENTOR(S) : Robert J. Menchetti It is certified that error appears in the above-identified patent and that said Letters Patent is hereby corrected as shown below:

Column 1, line 52, delete "a/modified" and replace with --a modified--.

Column 2, line 10, delete "1α3" and replace with --1-3--.

Column 3, line 4, delete "3inch" and replace with --3-inch--.

Column 5, line 61, delete "dip" and replace with --clip--.

Column 6, line 38, delete "meatal" and replace with --metal--.

Column 6, line 38, delete "dip" and replace with --clip--.

Column 6, line 40, insert --a-- between "and" and "clip".

Signed and Sealed this

Twenty-sixth Day of May, 1998

Attest:

BRUCE LEHMAN

Attesting Officer

Commissioner of Patents and Trademarks